United States Patent
Morgan, Richard M.

[15] 3,703,852

[45] Nov. 28, 1972

[54] PISTON AND ROD ASSEMBLY FOR PISTON AND CYLINDER DEVICES

[72] Inventor: Richard M. Morgan, Chicago, Ill.

[73] Assignee: Miller Fluid Power Corporation, Bensenville, Ill., a corporation of Illinois

[22] Filed: Aug. 13, 1970

[21] Appl. No.: 63,461

[52] U.S. Cl. ................ 92/258, 92/248, 92/255
[51] Int. Cl. ............................................F16j 1/12
[58] Field of Search...92/255, 256, 257, 258, 172, 248; 29/156.5, 456, 240.5; 287/20P, 52.05; 85/32CS

[56] References Cited

UNITED STATES PATENTS

| 3,061,455 | 10/1962 | Anthony | 151/14.5 |
| Re23,041 | 9/1948 | Smith | 287/20P |
| 2,152,681 | 4/1939 | Caminez | 85/32CS |
| 2,341,670 | 2/1944 | Stinson | 85/32CS |
| 2,512,316 | 6/1950 | Eckener | 85/32CS |
| 2,970,871 | 2/1961 | Flick | 92/257X |
| 3,140,642 | 7/1964 | Nelson et al. | 92/248 |
| 3,177,782 | 4/1965 | Sampson | 92/255 |
| 3,343,460 | 9/1967 | Jones | 92/169X |

FOREIGN PATENTS OR APPLICATIONS 752,846 5/1954 Great Britain ............. 85/1 C Primary Examiner—Edgar W. Geoghegan
Assistant Examiner—Irwin C. Cohen
Attorney—Hofgren, Wegner, Allen, Stellman and McCord

[57] ABSTRACT

In the field of precision hydraulic and pneumatic power systems, a piston to piston rod mounting utilizing the cylindrical smooth rod surface and the smooth piston bore to hold concentricity and squareness of the piston to the rod and utilizing a helical retainer wire threaded between the piston and rod, and a locking composition to fasten the assembly in intended position.

1 Claim, 2 Drawing Figures

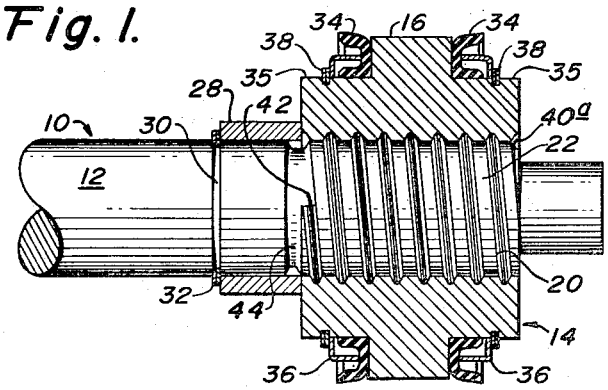
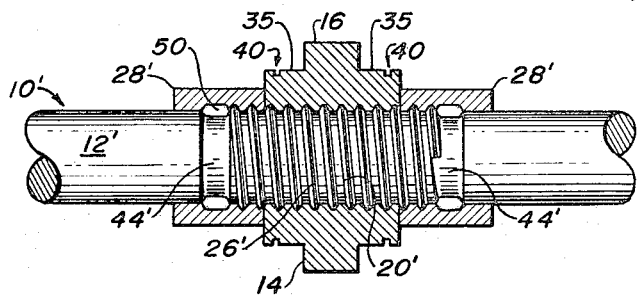
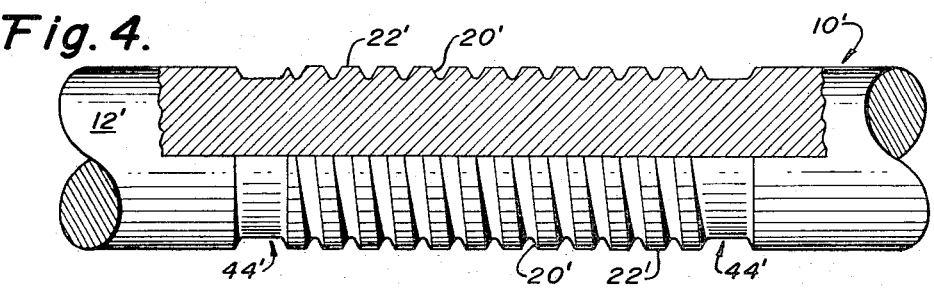
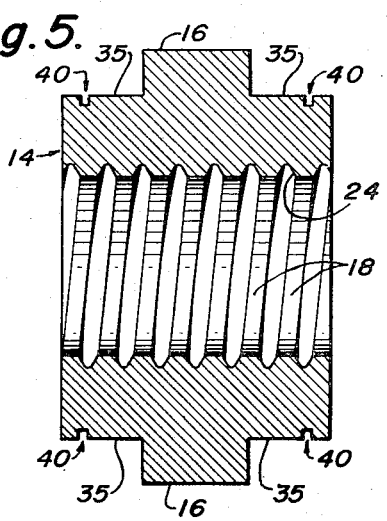
INVENTOR.
RICHARD M. MORGAN
BY Hofgren, Wegner, Allen
Stellman & McCord,
ATTORNEYS

PISTON AND ROD ASSEMBLY FOR PISTON AND CYLINDER DEVICES

BACKGROUND OF THE INVENTION

This invention relates to a piston to piston rod assembly for use in fluid powered piston and cylinder units, boosters, and other straight line motion devices, or the like, wherein the smooth bore in a piston mounts upon a mating smooth cylindrical surface on a piston rod. More particularly, the invention relates to a piston to piston rod assembly in precision hydraulic and pneumatic power systems of the type commonly called machine tool grade piston and cylinder devices.

Heretofore, piston to piston rod assemblies, of the character described, primarily have been manufactured by locating the piston on a reduced diameter portion of the piston rod so that the piston has a step in the rod against which to bear. With a single ended piston rod, wherein the piston is mounted on the rod adjacent one end thereof, the end of the rod was machined to a reduced diameter for receiving a piston having a through bore of a diameter to fit upon the reduced machined end of the piston rod. The piston is fastened in place by retaining means such as a collar threaded onto the reduced end of the rod.

With machine tool grade piston and cylinder devices, the maximum diametral clearance tolerable between the through bore of the piston and the cylindrical surface of the rod onto which the piston is mounted is in the order of .002 inch. However, in many situations today, it is expected that such diametral clearance actually be less than said maximum, and it is practically prohibitive to machine a reduced diameter cylindrical surface on the end of the piston rod to a concentric tolerance with the rod surface of less than .001 inch. Thus the required concentricity and squareness of the piston to the rod is not provided.

Concentricity between the rod and the periphery of the piston as well as squareness of the piston periphery is extremely important with precision hydraulic and pneumatic power systems to provide for leakproof operation and uniform seal wear. Concentricity and squareness of piston to rod assemblies insures that the rod may pass through its bushing and the piston slide in the bore of the cylinder with minimal friction due to misalignment. The piston and cylinder devices of this invention are intended for many years continuous service. Maintenance free operation is of the utmost importance.

With a double ended piston and piston rod assembly, the piston is located on a reduced diameter portion of the piston rod intermediate the ends of the rod. With this type of assembly, a two-piece piston rod is utilized, with adjacent ends of the two pieces threaded together, and with the reduced diameter portion of the rod, for recieving and locating the piston, being disposed at the joint of the rod. As with the single ended rod the reduced diameter portion on one or both of the two pieces must be machined. In order to provide concentricity of the center lines of the two pieces of the rod, it sometimes has been the practice to form one or more pairs of mating frustoconical locating surfaces or tapers between the two pieces of the rod at the joint where they are threaded together. Such tapered locating surfaces are not in common use and are quite expensive to machine to close tolerances to establish concentricity between the rod pieces. Often as not, such tapered surfaces fail to provide concentricity, strength, and squareness between the rod sections. It is more common simply to provide a plain cylinder pilot for the two pieces of the rod, and squareness is attempted to be maintained by locking the piston between opposed shoulders on the rod pieces. The latter technique fails to meet the aforesaid concentricity and squareness requirements.

This invention is directed to solving these problems by providing a means wherein the piston can be mounted directly onto the smooth cylindrical surface of the piston rod either with a single ended rod or a double ended rod.

SUMMARY OF THE INVENTION

This invention relates to a piston to piston rod assembly for use in fluid powered piston and cylinder devices, and particularly to precision type hydraulic and pneumatic devices.

A principal object of the invention is to provide a piston and piston rod assembly which greatly facilitates maintaining concentricity between the through bore of the piston and the cylindrical surface of the piston rod, to provide concentricity between the center line of the piston and the center line of the rod and squareness between the outer rod and piston surfaces.

Another object of this invention is to provide a piston and piston rod assembly generally of machine tool grade having a more uniform diametral clearance between the through bore of the piston and the cylinrical surface of the piston rod from assembly to assembly in manufacturing day to day operations.

A further object of the invention is to provide a piston and piston rod assembly for straight line powered motion devices, including a piston rod having a smooth, sometimes honed or chrome plated, cylindrical surface, a piston having a concentric periphery and through bore, the through bore of the piston being dimensioned to fit upon and over the smooth surface of the rod with tightness to maintain substantial concentricity between the cylindrical surface of the piston rod and the periphery of the piston, means forming a threaded groove between the piston and rod and partially in each, a fastening wire threaded into the groove for locating the piston on the rod against relative movement longitudinally of the rod, and means for locking the piston and rod in such assembly.

In the preferred embodiment of the invention, the means which forms the threaded groove is helical, with lands of the piston rod cylindrical surface being disposed between adjacent groove portions, and with the through bore of the piston being fit upon and over the lands of the piston rod along the length of the bore. A bonding agent, preferably a settable chemical compound, is located between the piston and rod in the area of the retaining wire for locking the piston and rod assembled. A cushion plunger may be positioned over the rod on at least one side of and abutting the piston, the plunger being held in place by a snap ring disposed in a circumferential groove in the surface of the rod.

Other objects, features and advantages of the invention will become apparent from the following detailed description taken in connection with the accompanying drawings.

DESCRIPTION OF THE DRAWINGS

FIG. 1 is a central sectional view through the piston on a single ended piston rod, with the rod in elevation, embodying the concepts of the present invention;

FIG. 2 is an end elevational view looking toward the assembly in FIG. 1 from the right hand end;

FIG. 3 is a central sectional view through the piston of a double ended piston rod and piston assembly, with the rod in elevation, embodying the concepts of the present invention;

FIG. 4 is an elevational view, partially cut away and on an enlarged scale, of a portion of the piston rod shown in FIG. 3;

FIG. 5 is a central section, on an enlarged scale, of the piston shown in FIGS. 1 and 5, isolated from the remainder of the assembly; and FIG. 6 is a fragmentary, exploded sectional view through a portion of the piston and the piston rod, and cross sectionally through the fastening wire of the present invention.

DETAILED DESCRIPTION OF THE INVENTION

The invention is shown herein as embodied in piston and piston rod assemblies with the pistons assembled both on single ended piston rods (FIGS. 1 and 2) and double ended piston rods (FIGS. 3 and 4). These embodiments of the invention are but for illustration purposes only and it is to be understood that the invention is intended for wide utility in the field of precision hydraulic and pneumatic power systems where it is necessary to assemble a member onto a rod or piston like member to maintain concentricity and squareness therebetween, such as trunnion mountings, or the like.

Referring first to FIG. 1, a single ended piston rod assembly for a fluid powered piston and cylinder device is shown comprising a piston rod, generally designated 10, having a smooth outer cylindrical surface 12 extending through a piston mounting location, as will be apparent hereinafter. The smooth outer cylindrical surface 12 of the piston rod may be honed or, frequently, may be chrome plated to provide a smooth surface. A piston, generally designated 14, is provided with a concentric outer cylindrical periphery 16 and a through bore, generally designated 18 in FIG. 5 where the piston 14 is shown isolated from the remainder of the assembly. The through bore 18 of the piston is dimensioned to fit upon and over the smooth cylindrical surface 12 of the piston rod 10 with a tightness to maintain substantial concentricity between the cylindrical surface 12 of the rod and the periphery 16 of the piston.

The piston rod 10 has a thread groove 20 along an extent of the rod which defines a piston mounting location, with portions or lands 22 of the smooth rod surface 12 extending longitudinally between adjacent thread portions of the groove. The body of the piston 14 has a length whereby the through bore 18 thereof covers the thread groove 20 in the piston rod 10 and bears upon the smooth rod surface portions or lands 22 between adjacent portions of the thread groove 20 of the piston rod to maintain the piston square to the rod and the piston periphery concentric with the rod.

Referring particularly to FIG. 5, a thread groove 24 is formed in the through bore 18 of the piston 14 so as to mate with the thread groove 20 on the piston rod 10 to form a cavity to threadably receive a helical retainer wire 26. The retainer wire is dimensioned to bear upon the walls of the grooves 20, 24, to locate the piston and rod relative to each other as shown in FIG. 1. FIG. 6 best shows the thread grooves 20 and 24 on the rod 10 and piston 14, respectively, which cooperate to form a cavity for receiving the retainer wire 26. The retainer wire preferably is formed of spring tempered metal. In actual practice, a drawn stainless steel wire having a tensile strength of 200-250,000 p.s.i. has proved satisfactory. The grooves 20, 24 are shown in the drawings to be triangularly shaped to receive a complementarily shaped retaining wire as seen in FIG. 6. However, round, square or other shaped retaining wires and complementarily shaped grooves are equally applicable.

Referring back to FIG. 1, a self-centering cushion plunger may be positioned over the piston rod 10 on either or both sides of the piston 14 (the left side in FIG. 1) and abutting the piston. A groove 30 is formed circumferentially about the piston for receiving a retaining split ring 32 which holds the cushion plunger 28 in abutment against the side of the piston 14.

The periphery 16 of the piston is sealed on opposite sides thereof by replaceable flanged ring seals 34 which are mounted on reduced diameter portions 35 of the piston. The seals are held in place by angle shaped retaining members 36 which are held against the seals by retaining split rings 38 (similar to the split ring 32) seated in grooves 40 formed about the piston 14. The flanged seals 34 may be replaced without the piston being disassembled from the rod 10 simply by removing the retaining split rings 38 and sliding the retaining members 36 off of the reduced diameter portions 35 of the piston whereby the seals 34 easily may be removed from the piston and replaced when worn.

In assembly, preferably the helical retaining wire 26, which has been formed in a appropriate length, is threaded onto the piston rod 10 in the thread groove 20, beginning as at 40a in FIG. 1, until the inner end 42 of the wire is generally at the location shown in FIG. 1, with approximately one-half of the thickness of the wire protruding outwardly from the piston rod surface forming a screw type thread on the rod surface. A settable chemical compound then is applied to the assembled retaining wire and adjacent rod surfaces. The settable chemical compound comprises a bonding agent and may also be applied to the through bore 18 and thread groove 24 of the piston. The piston then is turned onto the piston rod by threading onto the protruding retaining wire and the assembly is set aside a sufficient time for the bonding agent to set and tightly lock the piston and retaining wire in assembled position on the piston rod.

A relief 44 may be formed at the inner end of the thread groove 20 in the piston rod 10 should the groove be chased in an engine lathe. Other thread forming operations may not require such relief in the piston rod at the ends of the helical thread groove.

FIGS. 3 and 4 show a double ended piston rod assembly embodying the concepts of the present invention, similar to that described above. Like numerals will be applied where applicable. The double ended assembly shown in these figures has a through piston rod generally designated 10' on which is positioned and locked a piston 14 similar to that shown in FIGS. 1 and 5. The piston rod has a smooth cylindrical surface 12' which is maintained substantially concentric with the periphery 16 of the piston. The piston is like that shown in FIG. 5 and has a through bore 18 with the helical groove 24 formed to mate with a helically shaped groove 20' (FIG. 4) intermediate the ends of the rod or shaft 10' forming a helical cavity within which is received a helical retaining wire 26' (FIG. 3). The rod 10' may have reliefs 44' at opposite ends of the helical thread groove 20' as described relative to piston rod 10. The double ended piston rod assembly is assembled as described above for the single ended assembly of FIG. 1, and the piston, rod and retaining wire all are locked together by a bonding agent, preferably a settable chemical compound. Although they are not shown in the drawings, replaceable seals such as 34 in FIG. 1 may be employed and locked in place by split rings seated in grooves 40.

FIG. 4 best illustrates the smooth rod surface portions or lands 22' which remain between the groove portions of the threaded helical groove 20' on the piston rod 10'. As stated in relation to the assembly of FIG. 1, the through bore 18 of the piston 14, between the portions of the thread groove 24 in the piston, fits upon these lands 22' along the length of the through bore to maintain substantial concentricity between the cylindrical surface 12' of the rod and the periphery 16 of the piston. The relatively long piston bore 18 facilitates maintaining squareness between the length of the bore and the length of the rod. Heretofore it was desirable to have a relatively short or thin piston, utilizing replaceable seals. However, with the piston structure shown herein, the periphery 16 of the piston may be relatively thin, while providing a relatively long body portion for the piston through which the through bore 18 extends. Obviously, the longer the bore length through the piston, the better will be the squareness between the piston and the rod.

Referring to FIG. 3, it can be seen that the helical retaining wire 26' extends along the piston rod 10' beyond each side of the piston 14. Cushion plungers 28' are provided on opposite sides of the piston with helical grooves mating with the grooves in the piston rod to provide a helical cavity for receiving the ends of the helical retaining wire 26'. In this manner, once the piston 14 is properly positioned on the piston rod 10' and locked in place, the cushion plungers 28' simply are turned onto the ends of the retaining wire 26' until the cushion plungers abut against the side of the piston 14. A similar locking means, in the form of a settable chemical compound, may be employed between the piston rod 10' and the cushion plungers 28' to lock the cushion plungers in position in abutment on opposite sides of the piston. Mating grooves are formed in the piston rod 10' and the cushion plungers 28' to form an internal cavity 50 (FIG. 3) to provide some tolerance at the ends of the helical cavity to accommodate the ends of the helical wire should it be positioned too far to one side of the piston 14. Disassembly of any of the assemblies described may be accomplished by heating the assembly sufficiently to render the chemical compound fluid. Ordinarily such temperatures are above any working temperature encountered during day to day uses.

The foregoing detailed description has been given for clearness of understanding only and no unnecessary limitations should be understood therefrom as some modifications will be obvious to those skilled in the art.

I claim:

1. A piston and piston rod assembly for straight-line powered motion devices, comprising:
   a piston rod with a smooth surface,
   a piston having a periphery and a through bore to fit upon the rod with tightness to maintain substantial concentricity between the rod surface and said piston periphery, said piston having a length along said bore providing piston to rod bearing to hold the piston square to the rod,
   means forming a thread cavity between the piston and rod and partially in each,
   a retainer wire threaded into said cavity locating the piston on the rod against relative movement longitudinally of the rod,
   means for locking the piston and rod in such assembly,
   a cushion plunger over the rod at least on one side of the piston and abutting the piston, and
   means forming a thread cavity between the cushion plunger and rod and partially in each and forming a continuation of the thread cavity between the piston and rod, said retainer wire being threaded into at least a portion of the cavity between the cushion plunger and rod.

* * * * *